United States Patent Office 3,433,648
Patented Mar. 18, 1969

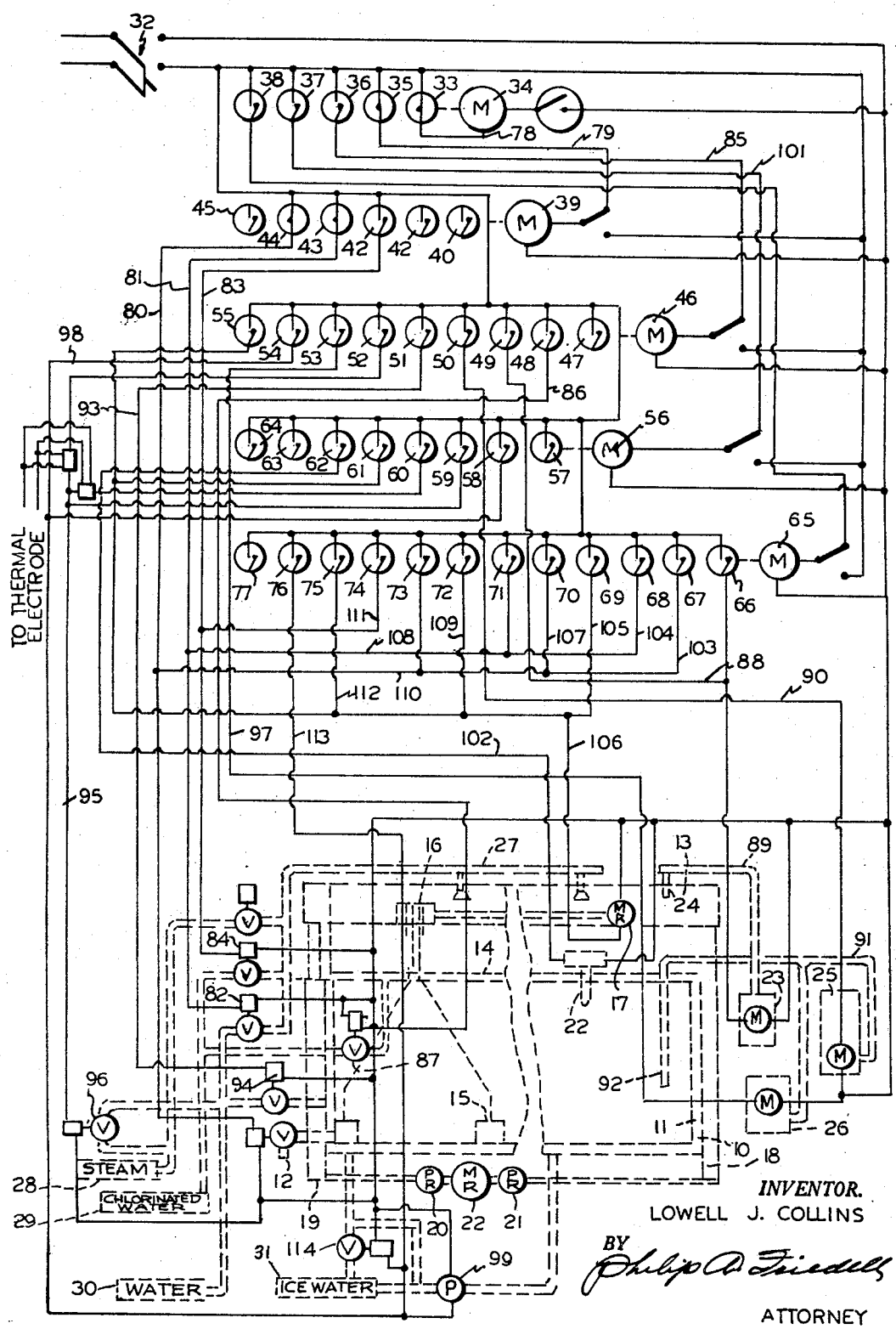

3,433,648
AUTOMATIC MEANS AND METHOD FOR PRODUCING CHEESE CURD
Lowell J. Collins, Oakland, Calif., assignor, by direct and mesne assignments, to Grace Machinery Corporation, Oakland, Calif., a corporation of California
Continuation of application Ser. No. 192,727, May 7, 1962. This application Aug. 21, 1967, Ser. No. 662,188
The portion of the term of the patent subsequent to Sept. 3, 1980, has been disclaimed and dedicated to the Public
U.S. Cl. 99—116                                              6 Claims
Int. Cl. A23c *19/02*

ABSTRACT OF THE DISCLOSURE

A method and automatic control apparatus is presented for processing milk culture contained in a sealed and sterilized vat having purified air applied thereto under a pressure slightly above atmospheric and maintained throughout the process to produce a high-quality cheese curd less susceptible to spoilage.

---

This application is a continuation of application Ser. No. 192,727, filed May 7, 1962, now abandoned.

This invention relates to a method and means for producing curd automatically under the most sanitary and sterile conditions, free of harmful bacteria and noxious gases which might be detrimental to the quality and flavor of the cottage cheese made from the curd, and provides a method in which the ingredients are maintained out of contact with atmospheric air throughout the process.

This automatic method is specifically adapted to the apparatus disclosed in my application, Ser. No. 180,543, filed Mar. 19, 1962 now Patent 3,102,336, issued Sept. 3, 1963, for Curd Producing Apparatus, because of the sealed cover which is provided for the vat, with the operations carried out within the enclosure in the presence of purified air under slight pressure, thus preventing any atmospheric air from entering the enclosure.

This invention provides for control of the various operations by a multiplicity of timing elements for initiating and terminating the various steps, from sterilization to completion of the curd process, with the ingredients maintained in a state of isolation from atmospheric air through the maintenance of purified air under slight pressure above atmospheric for gradual leak of the purified air through the cover sealing means and through any leaks that may be present in the cover, thus assuring a product free of the harmful bacteria and any noxious elements contained in atmospheric air, and to which the ingredients and finished curd have always been subjected through conventional manually controlled processes with the vat open to the atmosphere.

The objects and advantages of the invention are as follows:

First, to provide an automatic process for the production of curd for making cottage cheese.

Second, to provide a process as outlined in which the ingredients are delivered to a sterilized receptacle and carried through the process to completion of the curd in the presence of purified air under slight pressure within a sealed enclosure for complete isolation from atmospheric air.

Third, to provide a process as outlined in which all operations are individually timer controlled and automatically modified by temperature, volume, and pH controls.

Fourth, to provide a process as outlined in which the processing receptacle is provided with a sealed cover with the interior maintained under continuous slight pressure above atmospheric of purified, bacteria free air, to prevent ingress of contaminating and obnoxious gases and bacteria.

Fifth, to provide a system as outlined in which a multiple timer unit functions as a master unit for controlling operation of a plurality of circuit control timer units for sequential and parallel operations of the various control elements, used in the process.

In describing the invention reference will be had to the accompanying drawing, diagrammatically disclosing the apparatus in dotted figures, and including a wiring diagram in connection with the respective timer units.

The process is completed in twelve hours or less, depending on the capacity of the vat, the amount of culture added; the less culture, the longer the process. As outlined, the timers are arranged for an elapsed time of a little over twelve hours, though the elapsed time may be varied by other controls such as the pH control.

In addition to the master timer unit, there are four other multiple timer units, respectively initiating and controlling cleaning and sterilization of the vat and apparatus; filling and setting of the ingredients; cooking; and washing the curd.

The processing vat 10 is provided with a water jacket 11, a discharge outlet 12, a cover 13, the lower end of which is sealed in a trough 14 which extends about the top of the vat.

An agitator 15 is mounted for travel and rotation inside the cover, as indicated at 16, and driven by a motor 17 which reverses each time the carrier 16 reaches the respective terminals of travel.

The cover is elevated and lowered through the medium of fluid cylinders 18 and 19 which are independently and simultaneously operated by the reversible pumps 20 and 21 by the motor 22 which is manually controlled.

A pH control unit 22' is mounted on the cover with its electrodes projecting through the cover, and an air purifier or bacterial air conditioner 23 is in communication with the vat enclosure as indicated at 24.

A pasteurizer 25 and culture supply 26 are in communication with the vat, and both are adjusted to deliver specific volumes of skim milk and culture and terminate delivery automatically when the specific volumes have been delivered.

Available for delivery through a line 27 to spray heads positioned interiorly of the cover 13 is a steam supply 28, a chlorinated water supply 29, and municipal water supply 30. The chlorinated water is also available for the sealing trough; and the municipal water supply, the steam, and an ice water supply are available for the vat water jacket.

Following the completion of a previous cycle of operation, with the finished curd discharged from the vat, the cover is elevated through manual control of the motor 22. The vat is thoroughly cleaned and prepared for the next cycle of operations, following which, with the agitator in place, the cover is lowered to form an enclosure.

With all ingredients and supplies in readiness, the line switch 32 is closed, which completes circuit through the closed switch of timer 33 through motor 34 which drives the master series of timers 33, 35, 36, 37 and 38. Timer 35 also has its switch closed, with motor 39 thereby cut in circuit for driving the series of control timers 40 to 45. Timer 36 controls motor 46 for driving the series of control timers 47 to 55. Timer 37 controls motor 56 for driving the series of control timers 57 to 64. Timer 38 controls motor 65 for driving the series of control timers 66 to 77.

Thus the master timer unit 33 and 35 to 38 merely control the operation and timing of the control timer units, the control and master timers being of the conventional twin-cam type controlling conventional micro-switches.

Starters, overload switches, meters, and other similar well known devices and controls are not included, for simplification of the wiring diagram, since they are standard equipment and add nothing to patentability in the present application.

As previously mentioned, the switches of timers 33 and 35 are closed at the start of a cycle of operations.

Closing line switch 32 completes circuit through timer 33 to motor 34 through connection 78, starting the master series in operation, and simultaneously the circuit is completed through timer 35 to motor 39 through the connection 78, driving the cleaning and sterilizing multiple timer unit 40 to 45.

The switches of timers 44 and 43 also have their circuits closed, so that, when the line switch 32 is closed, the circuit is completed through timer 44 to solenoid valve 12, which opens the vat discharge 12, and simultaneously, timer 43 completes circuit through connection 81 to solenoid valve 82 for delivery of water under pressure through the pipe line 27 for rinsing the interior of the vat and cover, and after a predetermined elapsed time period, timer 43 breaks the circuit.

Timer 42 now completes circuit through line 83 to valve 84, admitting chlorinated water under pressure to the enclosure for sterilization, and following a predetermined delivery of approximately 160 gallons sprayed within the enclosure, the timer 42 breaks the circuit to terminate delivery, timer 44 maintaining the drain valve 12 open for a sufficient length of time for complete draining of the chlorinated water, then breaks the circuit for closing of the valve. This completes the cleaning and sterilizing cycle, and timer 35 breaks the circuit to motor 39.

At this point, timer 36 has completed circuit to motor 46 through connection 85, placing the filling, culturing and setting cycle in operation, driving timers 47 to 55, and simultaneously a circuit is completed through timer 48 and connection 86 to valve 87 for filling the sealing trough 14 with chlorinated water, and timer 49 completes circuit through connection 88 for operating the air purification apparatus or pressurized bacterial air conditioner 23, for delivery of purified air through the connection 89 into the enclosure through the nozzle 24, and at a pressure just sufficient to create some bubbling through the water seal in the trough, thus preventing atmospheric air from entering through any possible leaks in the cover, the pressure being maintained throughout the process.

Also at this time, a circuit is completed by timer 50 through line 90 to the pasteurizer 25 for delivery of skim milk through the tubular line 91, the nozzle of which projects down through the cover as indicated at 92, and following delivery of a predetermined quantity, about 2000 gallons, delivery automatically terminates by breaking the motor circuit, therefore termination of delivery is not dependent upon the timer. Also, simultaneously, timer 51 completes circuit through connection 93 to valve 94 to fill the water jacket with water to a predetermined level, then breaks the circuit.

Timer 52 simultaneously with timer 51, completes circuit through connection 95 to valve 96 for injection of steam into the water line for heating the water under thermal control, which maintains control of the steam delivery for maintenance of a predetermined temperature of approximately 90 degrees, which is, after a predetermined period, gradually raised to 105 degrees, and gradually continuing to the predetermined temperature, with the temperature control limited to a maximum of 145 degrees.

Timer 53 next completes circuit through connection 97 to the culture supply 26 for delivering culture to the milk in the vat through the nozzle 92, delivery being automatically controlled as to volume and therefore not dependent on the timer for termination of delivery.

Timer 54 next completes circuit through connection 98 for circulating the temperature control water in the jacket for a predetermined period of time, then breaks the circuit, with pump 99 providing the circulation.

When about half of the predetermined volume of milk has been delivered, timer 55 closes the circuit through connection 106 to motor 17 for operating the agitator 15 for longitudinal travel and rotation, the motor being reversible, and being automatically reversed at the respective terminals of longitudinal travel, the timer controlling the elapsed time of operation by breaking the circuit.

Timer 36 next breaks the circuit to motor 46 and master timer 37 completes circuit to motor 56, driving the series timer 57 to 64 of the cooking series timers, through the connection 101, with the circuit closed through timer 58 and connection 98 to the circulating pump 99 for maintaining circulation in the water jacket, and timer 59 is also closed through connection 95 for maintaining the temperature control circuit through the control 96. Timer 60 controls the temperature control circuit for increasing the temperature as previously mentioned.

After a predetermined period of time, timer 61 completes circuit to the agitator motor 17 for a predetermined period of time and again terminates operation.

Timer 62 completes circuit to the pH meter 22 through connection 102, following which timer 37 breaks circuit to motor 56, and coincidentally time 38 completes circuit to motor 65 for operation of the series of timers 66 to 77.

Timer 67 has its circuit closed through connection 103 to connection 80 to open the drain valve 12 for draining the whey from the curd, and breaks the circuit after a predetermined time elapse period, while timer 68 completes circuit through connection 104 to connection 81 for opening the valve 82 to spray head 27 for washing the curd, and timer 69 completes circuit through connections 105 and 106 to motor 17 for operation of the agitator, and breaking the circuit after a predetermined time interval.

Timer 70 now completes the circuit through connection 107 to connection 80 for opening the drain valve 12 for draining the wash water from the curd, and closes the valve after a predetermined time interval.

Timer 71 next completes circuit through connection 108 to connection 81 for again spraying the curd with wash water, and breaks circuit after a predetermined time elapse period, following which timer 72 completes circuit through connections 109 and 106 to motor 17 for re-agitation of the curd and wash water, breaking circuit after a predetermined time of operation.

Timer 73 next completes circuit through connection 110 to connection 80 for opening the drain valve for draining the wash water, and breaks the circuit after a predetermined time elapse period for closing the valve.

Timer 74 next complete circuit through connection 111 to connection 83 for delivering chlorinated water through the spray heads 27 and breaking circuit for closing of the valve for termination of delivery after a predetermined time elapse period.

Timer 75 next completes circuit through connection 112 and 106 to agitator motor 17 for agitation, and breaks circuit to terminate agitation after a predetermined time elapse period.

Timer 76 now completes circuit through connection 113 and 87 to valve 114 and pump 99 for delivering and circulating ice water through the water jacket to cool and maintain a temperature, through thermal control, of approximately 34 degrees F., in the vat.

When the operation of motor 46 is terminated, timer 49 maintains its switch closed until the switch 32 is opened and the timer units reset to zero, thus maintaining the purified air atmosphere under slight pressure within the enclosure until the curd is to be transferred to the cottage cheese mixers.

The process may consume anywhere from 4 to 12 hours, depending on the proportion of culture added to the milk, the temperature, the volume treated; the less culture, the longer the setting time; also, the greater the capacity of the vat, the greater length of time required for making the necessary thermal changes in the vat.

Thus, with a rapid process, of approximately six hours, the rinsing and sterilization cycle consumes about 20 minutes, filling the vat with skim milk takes up to one hour, curdling and setting about four hours, with the remainder of the time covering the cooking and washing.

Thus, with all ingredients and control devices and supplies in readiness, with a twelve hour process, the switch 32 can be closed, and no further attention paid until the curd is to be transferred to the mixer. The operation can be started at afternoon quitting time, and the curd will be ready for converting into cottage cheese the following morning.

I claim:
1. The method of processing milk and culture for the production of curd, consisting of the steps of:
   automatically timing and controlling sterilization of the apparatus,
   sealing the sterilized apparatus,
   applying purified air to the apparatus under a pressure slightly above atmospheric and maintaining such pressure throughout the process so as to isolate the sterilized apparatus from atmospheric air and prevent contamination from harmful bacteria,
   sequentially delivering milk and culture to the sealed apparatus,
   heating and agitating the mixture so formed,
   cooking the mixture for a predetermined interval to set the mixture to form a curd,
   draining of the whey from the curd so formed,
   washing the curd, and then
   cooling the washed curd while it is retained sealed within the apparatus.

2. An apparatus for the production of curd including a vat having a water jacket, a cover and means for sealing the cover on the vat, an agitator means within the vat, a drain means, means connecting the vat to sources of steam, wash water, sterilizing water and chlorinated water for sterilizing and heating the vat, means connecting the vat to sources of milk, culture, ice water and purified air under a pressure greater than atmospheric, the improvement comprising:
   a source of electric current,
   a main series of master control timer units selectively energized by said source of electric current, and
   a plurality of subsidiary series of control timer units sequentially energized and controlled by said main series of master control timer units,
   a first one of said subsidiary series of control timer units when energized effecting operation of the means connected to the vat to sterilize the interior thereof,
   a second one of said subsidiary series of control timer units when energized effecting operation of the means for sealing the cover to the vat, and connecting said purified air under pressure means for pressurization of the sterile vat, filling the vat with a predetermined quantity of milk, connecting said water jacket to said steam source for heating said milk to a predetermined temperature, connect said culture source for delivery of a predetermined quantity of culture to the milk, and operate said agitator means to agitate the milk within the vat for a predetermined time,
   a third one of said subsidiary series of control timer units when energized effecting further operation of said steam source connection to the vat for cooking said milk to effect curdling and setting thereof, and
   a fourth one of said subsidiary series of control timer units when energized effecting operation of said drain means for draining the whey and connecting said wash water source for washing the curd.

3. An apparatus for producing curd according to claim 2 in which said main series of master control timer units comprises a plurality of motor-driven cams operatively associated with micro-switches correlated to the subsidiary series of control timer units.

4. An apparatus for producing curd according to claim 2 in which the means for sealing the cover on the vat includes a trough on the vat for receiving said cover and said trough has chlorinated water therein in which an edge portion of said cover is immersed.

5. An apparatus for producing curd according to claim 4 wherein said purified air under pressure as controlled by said second one of said subsidiary series of control timer units is at a pressure sufficient to cause a flow of purified air from the inside of the vat to the outside thereof through said chlorinated water seal in said trough.

6. An apparatus for producing curd according to claim 2 wherein said fourth one of said subsidiary series of control timer units when energized also connects for operation in sequence:
   said agitator means to re-agitate the curd,
   said drain means to drain the wash water from the curd,
   said wash water source means to re-wash the curd,
   said agitator means to again re-agitate the curd,
   said drain means again to drain the second wash water from the curd,
   said chlorinated water source means to deliver chlorinated water to immerse the curd,
   said agitator means to further re-agitate the curd, and
   said ice water source to the water jacket of the vat to cool the curd after formation thereof and while immersed in the chlorinated water.

References Cited
UNITED STATES PATENTS

| | | | |
|---|---|---|---|
| 2,161,847 | 6/1939 | Blodgett | 99—325 |
| 2,781,269 | 2/1957 | Harper et al. | 99—243 X |
| 3,102,336 | 9/1963 | Collins | 31—48 |
| 3,120,168 | 2/1964 | Lippert | 99—238.3 |

OTHER REFERENCES

Whittier, E. O., et al.: By Products From Milk. Book Division, Reinhold Publishing Corp., N.Y., 1950 (pp. 130–133).

Holzbuck, W. G.: Automatic Control Principles and Practice, Reinhold Publishing Corp., N.Y., 1958, TJ213,-458, pp. 1–3 and 240–242.

A. LOUIS MONACELL, Primary Examiner.

D. M. NAPP, Assistant Examiner.

U.S. Cl. X.R.

31—46; 99—243